(12) United States Patent
Niitani

(10) Patent No.: US 11,007,720 B2
(45) Date of Patent: May 18, 2021

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventor: Haruhiko Niitani, Shiga (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 361 days.

(21) Appl. No.: 16/159,179

(22) Filed: Oct. 12, 2018

(65) Prior Publication Data

US 2019/0047229 A1 Feb. 14, 2019

Related U.S. Application Data

(62) Division of application No. 15/125,499, filed as application No. PCT/JP2016/059767 on Mar. 25, 2016, now Pat. No. 10,456,983.

(51) Int. Cl.
*B29C 64/393* (2017.01)
*B29C 64/268* (2017.01)
(Continued)

(52) U.S. Cl.
CPC ............ *B29C 64/393* (2017.08); *B22F 10/00* (2021.01); *B23K 26/342* (2015.10);
(Continued)

(58) Field of Classification Search
CPC .... B29C 64/118; B29C 64/268; B29C 64/393
See application file for complete search history.

(56) References Cited

U.S. PATENT DOCUMENTS 6,122,564 A 9/2000 Koch et al.
6,995,334 B1 2/2006 Kovacevic et al.
(Continued)

FOREIGN PATENT DOCUMENTS

EP 3045254 A1 7/2016
JP 7-108390 A 4/1995
(Continued)

OTHER PUBLICATIONS

Japanese Office Action dated Oct. 11, 2018 in connection with Japanese Patent Application No. 2017-202246, with English translation.

(Continued)

*Primary Examiner* — James Sanders
(74) *Attorney, Agent, or Firm* — Ladas & Parry LLP

(57) ABSTRACT

A three-dimensional laminating and shaping apparatus capable of measuring the quality of a three-dimensional laminated and shaped object in real time during shaping of the three-dimensional laminated and shaped object includes a material ejector that ejects the material of the three-dimensional laminated and shaped object onto a shaping table on which the three-dimensional laminated and shaped object is shaped, a light beam irradiator that irradiates the ejected material with a light beam, a data acquirer that acquires monitoring data used to monitor a shaping state of the three-dimensional laminated and shaped object during shaping of the three-dimensional laminated and shaped object, and a shaping quality estimator that estimates shaping quality of the three-dimensional laminated and shaped object based on the monitoring data.

7 Claims, 3 Drawing Sheets

(51) Int. Cl.
  *B29C 64/153* (2017.01)
  *B33Y 50/02* (2015.01)
  *B33Y 10/00* (2015.01)
  *B33Y 30/00* (2015.01)
  *B23K 26/342* (2014.01)
  *B29C 64/118* (2017.01)
  *B22F 10/00* (2021.01)
  *B22F 10/10* (2021.01)

(52) U.S. Cl.
  CPC .......... *B29C 64/118* (2017.08); *B29C 64/153* (2017.08); *B29C 64/268* (2017.08); *B33Y 10/00* (2014.12); *B33Y 30/00* (2014.12); *B33Y 50/02* (2014.12); *B22F 10/10* (2021.01); *B22F 2999/00* (2013.01); *Y02P 10/25* (2015.11)

(56) References Cited

U.S. PATENT DOCUMENTS

| | | | |
|---|---|---|---|
| 7,020,539 | B1 | 3/2006 | Kovacevic et al. |
| 8,546,717 | B2 | 10/2013 | Stecker |
| 2002/0166896 | A1 | 11/2002 | Mazumder |
| 2005/0173380 | A1 | 8/2005 | Carbone |
| 2008/0314878 | A1 | 12/2008 | Cai et al. |
| 2014/0014629 | A1 | 1/2014 | Stecker |
| 2016/0288244 | A1 | 10/2016 | Stecker |
| 2017/0144248 | A1 | 5/2017 | Yoshimura et al. |
| 2017/0341183 | A1 | 11/2017 | Buller |

FOREIGN PATENT DOCUMENTS

| | | |
|---|---|---|
| JP | 2002-519200 A | 7/2002 |
| JP | 2015-85547 A | 5/2015 |
| JP | 2015-196265 A | 11/2015 |

OTHER PUBLICATIONS

J-PlatPat English abstract of JP 2015-196265 A.
International Search Report (ISR) dated Jun. 14, 2016 for International Application No. PCT/JP2016/059767.
Written Opinion (WO) dated Jun. 14, 2016 for International Application No. PCT/JP2016/059767.
J-PlatPat English abstract of JP 2015-85547 A.
J-PlatPat English abstract of JP 7-108390 A.
Extended European Search Report (ESR) dated Apr. 6, 2018 mailed in connection with corresponding European Patent Application No. 16 826 691.4.
European Office Action dated Dec. 2, 2020 for Application No. EP 16826691.4.
Sarah K. Everton et al : "Review of in-situ process monitoring and in-situ metrology for metal additive manufacturing" Materials & Design, vol. 95, Jan. 23, 2016 (Jan. 23, 2016), pp. 431-445,XP055320137, Amsterdam, NL ISSN: 0264-1275, DOI: 10.1016/j.matdes.2016.01.099.

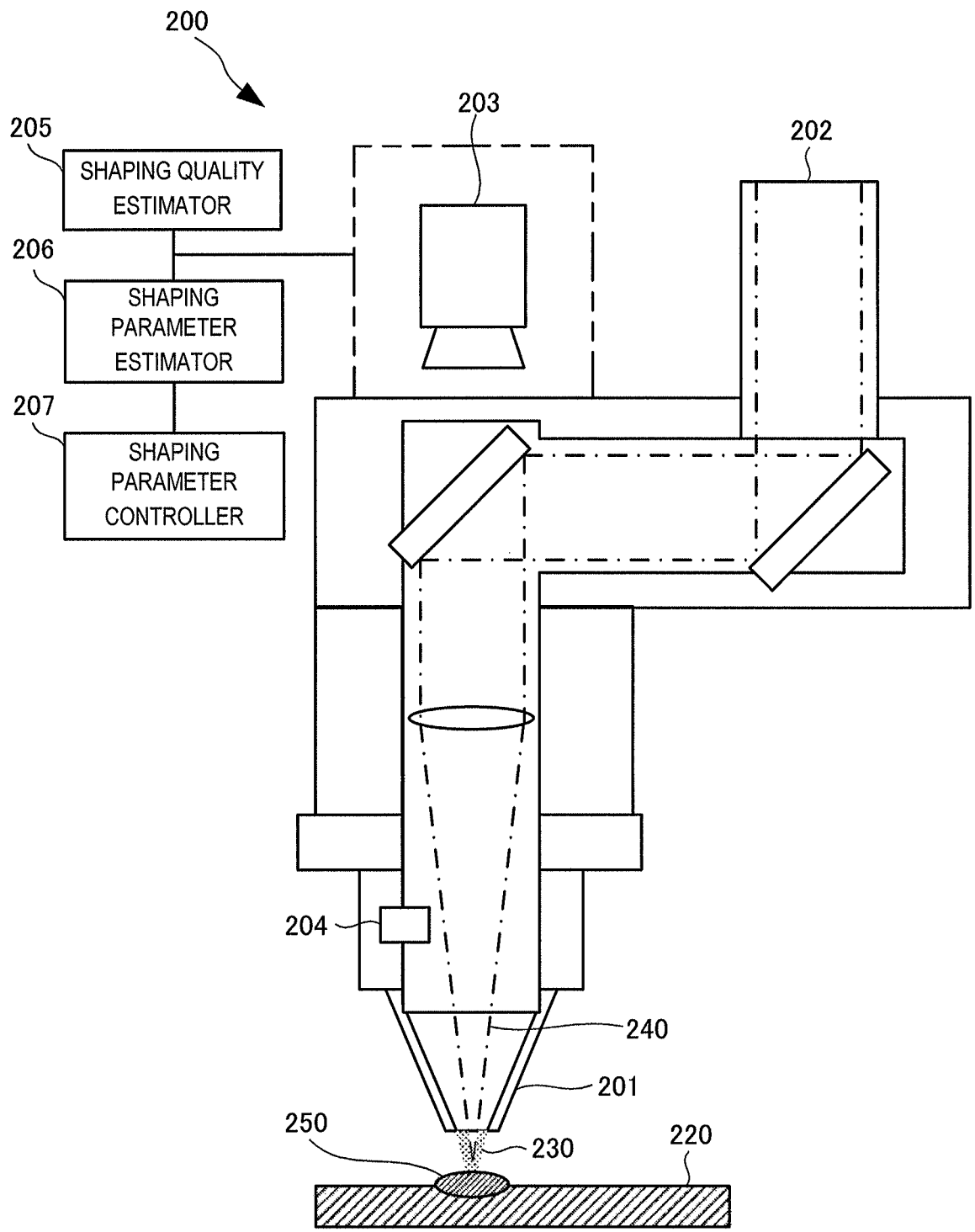
F I G. 2

300

| SHAPING PARAMETER | | (CHANGE IN) MONITORING DATA | | | (CHANGE IN) SHAPING QUALITY | | |
|---|---|---|---|---|---|---|---|
| PARAMETER | CHANGE | MOLTEN POOL DIAMETER | REFLECTED LIGHT LEVEL | PLASMA LIGHT WAVELENGTH | LAYER HEIGHT | LAYER WIDTH | MATERIAL TEXTURE |
| MATERIAL SUPPLY AMOUNT | DECREASE | UNCHANGED | INCREASE | UNCHANGED | DECREASE | UNCHANGED | DEGRADE (ROUGHEN) |
| SHIELD GAS | DECREASE | UNCHANGED | DECREASE | UNCHANGED | UNCHANGED | UNCHANGED | DEGRADE (OXIDIZE) |
| LASER OUTPUT | DECREASE | DECREASE | DECREASE | UNCHANGED | DECREASE | DECREASE | DEGRADE (ROUGHEN) |
| MATERIAL PURITY (PROPERTIES) | LOWER | UNCHANGED | UNCHANGED | CHANGE | UNCHANGED | UNCHANGED | DEGRADE (COMPOUND) |

303 / 301 / 302

F I G. 3

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is a divisional of U.S. application Ser. No. 15/125,499 filed on Sep. 12, 2016, which is an application under 35 U.S.C. 371 of International Application No. PCT/JP2016/059767 filed on Mar. 25, 2016, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of measuring the shape of a layer and the shape of a shaped laminated and shaped object by a camera.

CITATION LIST

Patent Literature

Patent literature 1: Japanese Patent Laid-Open No. 2015-85547

SUMMARY OF THE INVENTION

Technical Problem

In the technique described in the above literature, the shape of a shaped object can be measured. However, the quality of a three-dimensional laminated and shaped object cannot be estimated in real time during shaping of the three-dimensional laminated and shaped object. It is therefore impossible to shape a high-precision three-dimensional laminated and shaped object.

The present invention enables to provide a technique of solving the above-described problem.

Solution to Problem

One aspect of the present invention provides a three-dimensional laminating and shaping apparatus comprising:
  a material ejector that ejects a material of a three-dimensional laminated and shaped object onto a shaping table on which the three-dimensional laminated and shaped object is shaped;
  a light beam irradiator that irradiates the ejected material with a light beam;
  a data acquirer that acquires monitoring data used to monitor a shaping state of the three-dimensional laminated and shaped object during shaping of the three-dimensional laminated and shaped object; and
  a shaping quality estimator that estimates shaping quality of the three-dimensional laminated and shaped object based on the monitoring data.

Another aspect of the present invention provides a control method of a three-dimensional laminating and shaping apparatus, comprising:
  ejecting a material of a three-dimensional laminated and shaped object onto a shaping table on which the three-dimensional laminated and shaped object is shaped;
  irradiating the ejected material with a light beam;
  acquiring monitoring data used to monitor a shaping state of the three-dimensional laminated and shaped object during shaping of the three-dimensional laminated and shaped object; and
  estimating shaping quality of the three-dimensional laminated and shaped object based on an image captured in the capturing.

Still another aspect of the present invention provides a control program of a three-dimensional laminating and shaping apparatus for causing a computer to execute a method, comprising:
  ejecting a material of a three-dimensional laminated and shaped object onto a shaping table on which the three-dimensional laminated and shaped object is shaped;
  irradiating the ejected material with a light beam;
  acquiring monitoring data used to monitor a shaping state of the three-dimensional laminated and shaped object during shaping of the three-dimensional laminated and shaped object; and
  estimating shaping quality of the three-dimensional laminated and shaped object based on an image captured in the capturing.

Advantageous Effects of Invention

According to the present invention, it is possible to shape a high-precision three-dimensional laminated and shaped object.

BRIEF DESCRIPTION OF DRAWINGS

FIG. 2 is a view showing the outline of the arrangement of a three-dimensional laminating and shaping apparatus according to the second embodiment of the present invention; and FIG. 3 is a view showing an example of the relationship between shaping quality and shaping parameters and a change in monitoring data acquired by the three-dimensional laminating and shaping apparatus according to the second embodiment of the present invention.

DESCRIPTION OF THE EMBODIMENTS

Figure 1:
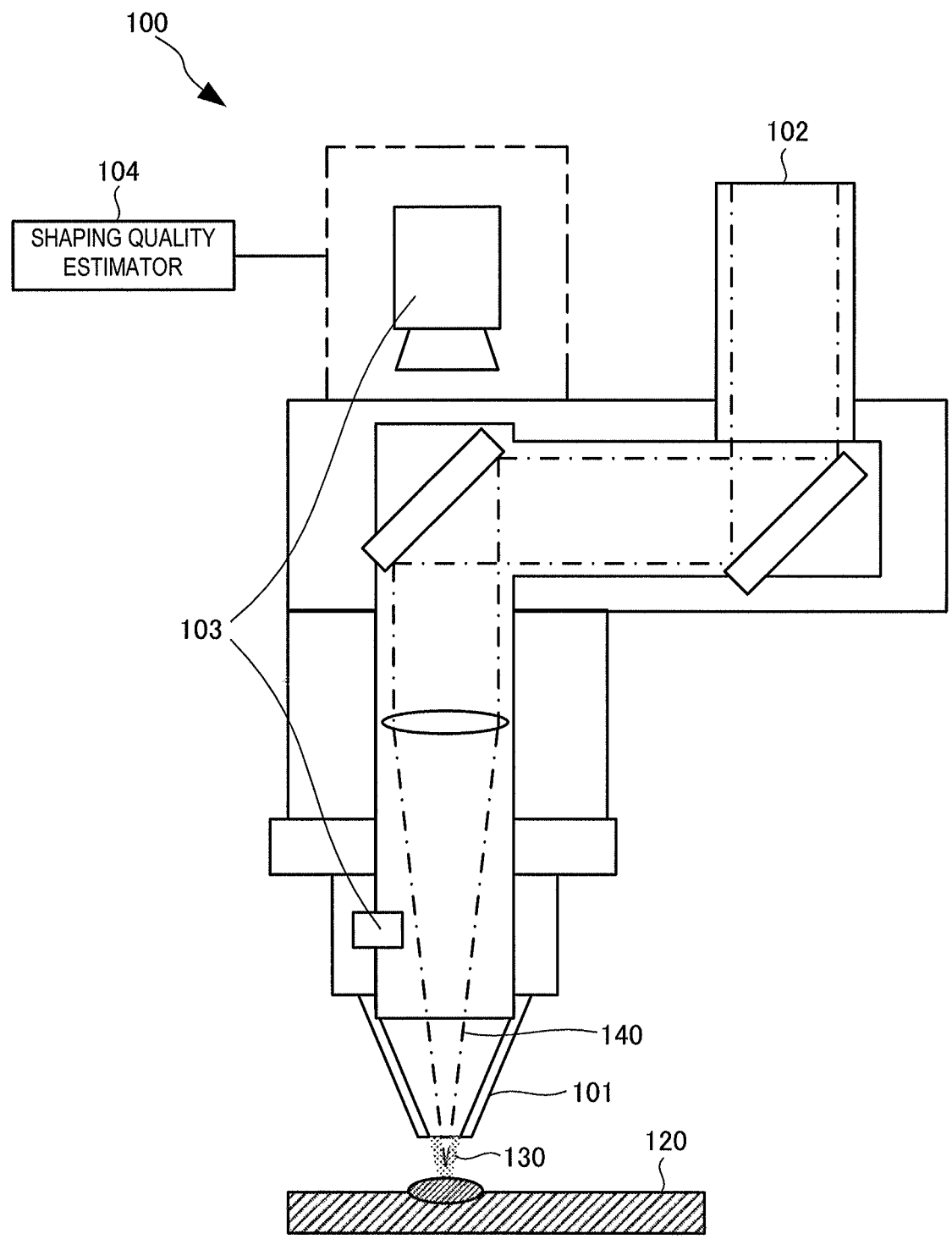
FIG. 1 is a view showing the outline of the arrangement of a three-dimensional laminating and shaping apparatus according to the first embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A three-dimensional laminating and shaping apparatus 100 according to the first embodiment of the present invention will be described with reference to FIG. 1. The three-dimensional laminating and shaping apparatus 100 is an apparatus for shaping a three-dimensional laminated and shaped object by ejecting a material 130 onto a shaping table 120, and irradiating the ejected material 130 with a light beam 140.

As shown in FIG. 1, the three-dimensional laminating and shaping apparatus 100 includes a material ejector 101, a light beam irradiator 102, a data acquirer 103, and a shaping quality estimator 104. The material ejector 101 ejects the material 130 of the three-dimensional laminated and shaped object onto the shaping table 120 on which the three-dimensional laminated and shaped object is shaped. The light beam irradiator 102 irradiates the ejected material 130 with the light beam 140. The data acquirer 103 acquires monitoring data used to monitor the shaping state of the three-dimensional laminated and shaped object during shaping of the three-dimensional laminated and shaped object. The shaping quality estimator 104 estimates the shaping quality of the three-dimensional laminated and shaped object based on the monitoring data.

According to this embodiment, the quality of a three-dimensional laminated and shaped object can be estimated in real time during shaping of the three-dimensional laminated and shaped object. It is therefore possible to shape a high-precision three-dimensional laminated and shaped object.

Second Embodiment

A three-dimensional laminating and shaping apparatus 200 according to the second embodiment of the present invention will be described next with reference to FIGS. 2 and 3. FIG. 2 is a view showing the outline of the arrangement of the three-dimensional laminating and shaping apparatus 200 according to this embodiment.

The three-dimensional laminating and shaping apparatus 200 includes a nozzle 201, a light beam irradiator 202, a camera 203, a sensor 204, a shaping quality estimator 205, a shaping parameter estimator 206, and a shaping parameter controller 207.

The nozzle 201 ejects a metal powder or a resin powder that is a material 230 of a three-dimensional laminated and shaped object onto a shaping table 220. A light beam irradiator 202 radiates a light beam 240 such as a laser beam and irradiates the material 230 with the light beam 240 from the opening at the tip of the nozzle 201. The material 230 irradiated with the light beam 240 such as a laser beam or an electron beam melts by heat given by the light beam 240 and forms a molten pool 250.

The camera 203 is an image capturing device that is arranged on the axis of the nozzle 201 and captures an image (video) of the molten pool 250. Based on the image of the molten pool 250 captured by the camera 203, for example, a molten pool diameter that is the diameter of the molten pool 250 or the temperature of the molten pool 250 can be detected. The sensor 204 detects a reflected light level such as the luminance or intensity of the reflected light of the light beam 240 such as a laser beam from the molten pool 250. The sensor 204 also detects a plasma light wavelength that is the wavelength of plasma light radiated from the molten pool 250.

The molten pool diameter detected by the camera 203 and the reflected light level and the plasma light wavelength detected by the sensor 204 are monitoring data, all of which are data detected during laminating and shaping of the three-dimensional laminated and shaped object. The monitoring data are also data used to monitor the shaping state of the three-dimensional laminated and shaped object.

The shaping quality estimator 205 estimates the shaping quality of the three-dimensional laminated and shaped object. Shaping quality estimation is done based on the monitoring data. The monitoring data includes at least one of the molten pool diameter, the reflected light level, and the plasma light wavelength. However, the data included in the monitoring data are not limited to these, and any data detectable during shaping of the three-dimensional laminated and shaped object can be included.

The shaping quality estimated by the shaping quality estimator 205 includes at least one of a material texture, a layer width, and a layer height. However, the qualities are not limited to these. The shaping quality estimator 205 estimates the shaping quality of the three-dimensional laminated and shaped object indirectly based on the monitoring data.

There is also a method of cutting a generated three-dimensional laminated and shaped object and inspecting the cut section to decide shaping quality. In the method of cutting a completed three-dimensional laminated and shaped object and inspecting shaping quality, however, laminating and shaping of the three-dimensional laminated and shaped object needs to be executed again after the inspection of the shaping quality. In such a method, the material 230 is wasted. Additionally, since the three-dimensional laminated and shaped object needs to be shaped once again, time is needed to complete the three-dimensional laminated and shaped object.

On the other hand, since the shaping quality of the three-dimensional laminated and shaped object can be estimated by the shaping quality estimator 205, though indirectly, based on the monitoring data during the laminating and shaping of the three-dimensional laminated and shaped object, the material 230 is not wasted. In addition, the three-dimensional laminated and shaped object of desired quality can be shaped in a short time.

The shaping parameter estimator 206 estimates a shaping parameter necessary for shaping of the three-dimensional laminated and shaped object. The shaping parameter estimation is done based on the monitoring data. The shaping parameter estimated by the shaping parameter estimator 206 includes at least one of a material supply amount, a shield gas supply amount, a light beam output, and a material purity. The material supply amount is the supply amount of the material 230 of the three-dimensional laminated and shaped object. The shield gas supply amount is the supply amount of a shield gas. The shield gas is a gas supplied to prevent oxidation of the material 230 or the like. The light beam output is the output (power) of the light beam 240 such as a laser beam. The material purity concerns the properties of the material 230, for example, the type of the material 230 such as a metal or a resin.

The shaping parameter controller 207 controls the shaping parameters necessary for the shaping of the three-dimensional laminated and shaped object based on the shaping quality of the three-dimensional laminated and shaped object estimated by the shaping quality estimator 205. The shaping parameter controller 207 also controls the shaping parameters necessary for the shaping of the three-dimensional laminated and shaped object based on the acquired monitoring data.

FIG. 3 is a relationship diagram showing an example of the relationship between shaping quality and shaping parameters and a change in monitoring data acquired by the three-dimensional laminating and shaping apparatus according to this embodiment. For example, the shaping quality estimator 205 refers to a relationship diagram 300 and estimates a change in shaping quality 302 and the like based on a change in monitoring data 301 and the like. Similarly, the shaping parameter estimator 206 refers to the relationship diagram 300 and estimates a change in a shaping parameter 303 and the like based on a change in the monitoring data 301 and the like.

Note that in the relationship diagram 300, all the monitoring data 301, the shaping quality 302, and the shaping parameter 303 can be attained as numerical data, and the three-dimensional laminating and shaping apparatus 200 automatically determines a change in the shaping quality 302, a change in the shaping parameter 303, and the like based on these numerical data. Note that in the relationship diagram 300, the degree of a change is expressed by wording representing a state such as "decrease" or "unchanged". However, the degree of a change can also be expressed as a numerical value.

(1) If, out of the monitoring data 301, the "reflected light level" increases, and the "molten pool diameter" and the "plasma light wavelength" do not change, the "layer width" out of the shaping quality 302 do not change, as is apparent from the relationship diagram 300. Additionally, the "material quality" degrades (roughens), and the "layer height" decreases, as can be seen.

As for the shaping parameter 303, the "material supply amount" decreases, as is apparent. That is, when the "material supply amount" decreases, the amount of the material such as a metal powder contained in the material supply gas decreases, and accordingly, the substance that shields the reflected light from the molten pool 250 decreases. For this reason, the "reflected light level" increases. Hence, in this case, the three-dimensional laminating and shaping apparatus 200 controls the shaping parameters 303 to increase the material supply amount.

On the other hand, the "molten pool diameter" and the "plasma light wavelength" do not change. The "molten pool diameter" does not change because it is the spot diameter of the light beam 240 such as a laser beam and does not depend on the material supply amount. The "plasma light wavelength" does not change because even if the amount of the supplied material 230 increases/decreases, the wavelength of the plasma light radiated from the molten pool 250 does not change unless the properties of the material 230 change.

(2) If, out of the monitoring data 301, the "reflected light level" decreases, and the "molten pool diameter" and the "plasma light wavelength" do not change, the "material texture" out of the shaping quality 302 degrades (oxidizes), as is apparent. The "layer width" and the "layer height" do not change, as can be seen.

As for the shaping parameter 303, the supply amount of the "shield gas" decreases, as is apparent. That is, when the supply amount of the "shield gas" decreases, the supply amount of the gas used to prevent oxidation of the material 230 decreases. For this reason, the material 230 oxidizes, and the surface of the material 230 darkens to absorb the light beam 240 such as a laser beam. Hence, the "reflected light level" that is the luminance or intensity of the reflected light decreases. The "molten pool diameter" and the "plasma light wavelength" do not change due to the above-described reasons. In this case, the three-dimensional laminating and shaping apparatus 200 controls the shaping parameters 303 to increase the supply amount of the shield gas.

(3) If, out of the monitoring data 301, the "molten pool diameter" and the "reflected light level" decrease, and the "plasma light wavelength" does not change, the "material texture" out of the shaping quality 302 degrades (roughens), as is apparent. The "layer width" and the "layer height" decrease, as can be seen.

As for the shaping parameter 303, the "laser output" decreases, as is apparent. That is, when the "laser output" decreases, the output of the light beam 240 such as a laser beam decreases, and accordingly, the luminance or intensity of the light beam 240 decreases. For this reason, the "molten pool diameter" and the "reflected light level" inevitably decrease. Additionally, since the "laser output" decreases, the amount of heat given to the material 230 also decreases. Accordingly, the composition of the "material texture" (material composition) degrades, and the "layer width" and the "layer height" decrease as well. In this case, the three-dimensional laminating and shaping apparatus 200 controls the shaping parameters 303 to increase the laser output.

(4) If, out of the monitoring data 301, the "plasma light wavelength" changes, and the "molten pool diameter" and the "reflected light level" do not change, the "material texture" out of the shaping quality 302 degrades (compound), as is apparent. The "layer width" and the "layer height" do not change, as can be seen.

As for the shaping parameter 303, the "material purity (material property)" lowers, as is apparent. That is, when the "material purity (material property)" lowers, an impurity mixes with the material 230, or the material 230 of different properties mixes. For this reason, a compound is formed in the completed three-dimensional laminated and shaped object because of the mixture of the plurality of materials 230. Hence, the completed three-dimensional laminated and shaped object is not formed from a single material 230, and the quality as a shaped object lowers. The "layer width" and the "layer height" do not change, as can be seen. In this case, the three-dimensional laminating and shaping apparatus 200 controls the shaping parameters 303 to increase the material purity.

According to this embodiment, a change in the quality or a change in a shaping parameter of a three-dimensional laminated and shaped object can be estimated in real time during shaping of the three-dimensional laminated and shaped object. It is therefore possible to shape a high-precision three-dimensional laminated and shaped object. In addition, since monitoring data is monitored during shaping, a change in the shaping quality or a change in the shaping parameter can be detected in real time indirectly via a change in the monitoring data or the like. Furthermore, the user can know a change in the shaping quality (result) and a change in the shaping parameter (cause) by monitoring a change in the monitoring data or the like.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A control method of a three-dimensional laminating and shaping apparatus, comprising:
   ejecting a material of a three-dimensional laminated and shaped object onto a shaping table on which the three-dimensional laminated and shaped object is shaped;
   irradiating the ejected material with a light beam;
   acquiring monitoring data used to monitor a shaping state of the three-dimensional laminated and shaped object during shaping of the three-dimensional laminated and shaped object; and
   estimating shaping quality of the three-dimensional laminated and shaped object based on the monitoring data,
   wherein said monitoring data includes a diameter of a molten pool and a property data of a light from the molten pool,
   wherein in estimating the shaping quality, a decreasing of the shaping quality of the three-dimensional laminated and shaped object is estimated from a combination of whether the diameter of the molten pool has been changed or not and whether the property data of the light from the molten pool has been changed or not, when at least one of the diameter of the molten pool and the property data of the light from the molten pool has been changed.

2. The control method according to claim 1, further comprising estimating a shaping parameter necessary for the shaping of the three-dimensional laminated and shaped object based on the monitoring data.

3. The control method according to claim 1, further comprising controlling the shaping parameter necessary for the shaping of the three-dimensional laminated and shaped object based on the shaping quality of the three-dimensional laminated and shaped object estimated in said estimating step.

4. The control method according to claim 3, further comprising controlling the shaping parameter necessary for the shaping of the three-dimensional laminated and shaped object based on the monitoring data acquired in said acquiring step.

5. The control method according to claim 1, wherein the monitoring data includes at least one of a reflected light level, and a plasma light wavelength as the property data of the light from the molten pool.

6. The control method according to claim 2, wherein the shaping parameter includes at least one of a material supply amount, a shield gas supply amount, a light beam output, and a material purity.

7. The control method according to claim 1, wherein the shaping quality includes at least one of a layer height of the three-dimensional laminated and shaped object, a layer width of the three-dimensional laminated and shaped object, and a material composition of the three-dimensional laminated and shaped object.

* * * * *